United States Patent
Arjakine et al.

(10) Patent No.: US 10,458,250 B2
(45) Date of Patent: Oct. 29, 2019

(54) BUILD-UP STRATEGY FOR A CROWN BASE OF A TURBINE BLADE, AND TURBINE BLADE

(71) Applicants: Siemens Aktiengesellschaft, München (DE); Fraunhofer Gesellschaft zur Förderung der angewandten Forschung e.V., München (DE)

(72) Inventors: Nikolai Arjakine, Berlin (DE); Georg Bostanjoglo, Berlin (DE); Bernd Burbaum, Falkensee (DE); Andres Gasser, Aachen (DE); Stefanie Linnenbrink, Kreuzau (DE); Andre Mehlhorn, Berlin (DE); Frank Mentzel, Aachen (DE); Michael Ott, Mülheim an der Ruhr (DE); Norbert Pirch, Aachen (DE)

(73) Assignees: Siemens Aktiengesellschaft (DE); FRAUNHOFER GESELLSCHAFT ZUR FÖRDERUNG DER ANGEWANDTEN FORSCHUNG E.V. (DE)

(*) Notice: Subject to any disclaimer, the term of this patent is extended or adjusted under 35 U.S.C. 154(b) by 254 days.

(21) Appl. No.: 15/514,439

(22) PCT Filed: Oct. 1, 2015

(86) PCT No.: PCT/EP2015/072697
§ 371 (c)(1),
(2) Date: Mar. 24, 2017

(87) PCT Pub. No.: WO2016/055350
PCT Pub. Date: Apr. 14, 2016

(65) Prior Publication Data
US 2017/0306763 A1    Oct. 26, 2017

(30) Foreign Application Priority Data

Oct. 9, 2014  (DE) .................. 10 2014 220 483

(51) Int. Cl.
*F01D 5/14* (2006.01)
*B23P 6/00* (2006.01)
(Continued)

(52) U.S. Cl.
CPC ............. *F01D 5/147* (2013.01); *B23K 26/08* (2013.01); *B23K 26/34* (2013.01); *B23P 6/007* (2013.01);
(Continued)

(58) Field of Classification Search
CPC ...... F01D 5/147; F01D 5/14; F05D 2230/232; F05D 2230/234; F05D 2230/30;
(Continued)

(56) References Cited

U.S. PATENT DOCUMENTS 5,822,852 A    10/1998   Bewlay et al.
6,332,272 B1 *  12/2001   Sinnott ............... B23P 6/002
                                                   29/402.08
(Continued)

FOREIGN PATENT DOCUMENTS

CN   102448650 A    5/2012
DE      855348 C   11/1952
(Continued)

OTHER PUBLICATIONS

EP 2719493; Kaiser et al.; Welding Joint used for repairing component; May 16, 2019; EPO English Machine Translation; pp. 1-8.*
(Continued)

*Primary Examiner* — Bayan Salone
(74) *Attorney, Agent, or Firm* — Schmeiser, Olsen & Watts, LLP

(57) ABSTRACT

Applying material along parallel welding lines per welding layer, and changing a direction of extension of the welding tracks by 90° for the next welding layer, is provided.

13 Claims, 3 Drawing Sheets

(51) Int. Cl.
    *B23K 26/34*     (2014.01)
    *B23K 26/08*     (2014.01)
    *B23K 101/00*     (2006.01)

(52) U.S. Cl.
    CPC .......... *F01D 5/14* (2013.01); *B23K 2101/001* (2018.08); *F05D 2230/232* (2013.01); *F05D 2230/234* (2013.01); *F05D 2230/30* (2013.01); *F05D 2230/80* (2013.01)

(58) Field of Classification Search
    CPC ..... F05D 2230/80; B23P 6/007; B23K 26/08; B23K 26/34; B23K 2101/001
    USPC ....... 29/889.1, 889.2, 889.21, 889.7, 402.18, 29/402.16; 228/112.1, 119, 2.1, 231, 228/232; 416/224, 213 R, 213 A; 415/183, 216.1; 148/525, 527, 524
    See application file for complete search history.

(56) References Cited

U.S. PATENT DOCUMENTS

| | | | |
|---|---|---|---|
| 6,568,077 B1 | 5/2003 | Hellemann et al. | |
| 6,969,821 B2 | 11/2005 | Mika et al. | |
| 8,206,121 B2 | 6/2012 | Rose | |
| 2010/0224600 A1* | 9/2010 | Anton | B23K 15/0086 219/121.14 |
| 2012/0000890 A1 | 1/2012 | Ito | |
| 2012/0103950 A1* | 5/2012 | Arjakine | B23K 9/04 219/121.64 |
| 2013/0232749 A1 | 9/2013 | Bruck | |
| 2014/0262124 A1 | 9/2014 | Vilaro et al. | |
| 2015/0377043 A1 | 12/2015 | Haraguchi et al. | |

FOREIGN PATENT DOCUMENTS

| | | | |
|---|---|---|---|
| DE | 3050319 C2 | 6/1988 | |
| DE | 3942051 B4 | 7/2006 | |
| DE | 10 2009 016260 A1 | 10/2010 | |
| DE | 102009016260 A1 | 10/2010 | |
| EP | 2 311 597 A1 | 4/2011 | |
| EP | 2311597 A1 | 4/2011 | |
| EP | 2591876 A1 | 5/2013 | |
| EP | 2 719 493 A1 | 4/2014 | |
| EP | 2719493 A1 | 4/2014 | |
| EP | 2719493 A1 * | 4/2014 | ............... B23K 9/04 |
| JP | 2014173582 A | 9/2014 | |
| RU | 99103981 A | 1/2001 | |
| RU | 2377110 C2 | 12/2009 | |
| RU | 2420610 C1 | 6/2011 | |
| WO | 01 51772 A1 | 7/2001 | |
| WO | WO 0151772 A1 | 7/2001 | |
| WO | WO 2013060981 A2 | 5/2013 | |

OTHER PUBLICATIONS

International Search Report for PCT Application No. PCT/EP2015/072697, dated Dec. 10, 2015.
English Translation of Korean Office Action for Application No. 10-2017-7011847 dated May 20, 2019.

* cited by examiner

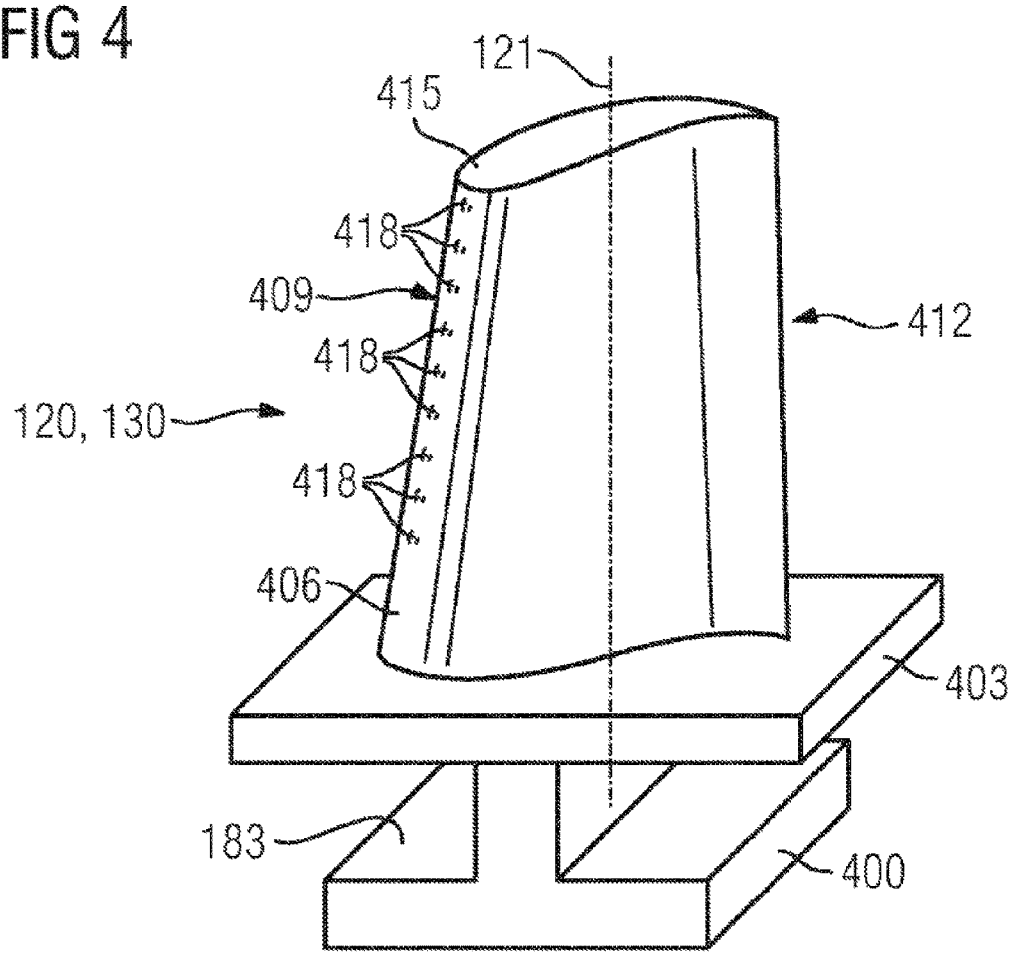

FIG 5

| material | chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based investment casting alloy | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 16.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX 2 | <.006 | 8.0 | Rest | 4.6 | 0.6 | 8.0 | 6.0 | | 5.6 | 1.0 | <.003 | <.0075 | |
| CMSX 3 | <.006 | 8.0 | Rest | 4.6 | 0.6 | 8.0 | 6.0 | | 5.6 | 1.0 | <.003 | <.0075 | 0.10 |
| CMSX 4 | | 6.0 | Rest | 10.0 | 0.6 | 6.0 | 6.0 | | 5.6 | 1.0 | | Re=3.0 | 0.10 |
| CMSX 6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-based investment casting alloy | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 |

BUILD-UP STRATEGY FOR A CROWN BASE OF A TURBINE BLADE, AND TURBINE BLADE

CROSS-REFERENCE TO RELATED APPLICATIONS

This application claims priority to PCT Application No. PCT/EP2015/072697, having a filing date of Oct. 1, 2015, based off of European application No. DE 102014220483.6 having a filing date of Oct. 9, 2014, the entire contents of which are hereby incorporated by reference.

FIELD OF TECHNOLOGY

The following relates to a build-up strategy during deposition welding of a crown base of a turbine blade and to the thereby produced turbine blade with a feathered edge on the crown base.

BACKGROUND

In particular, the tips of a turbine blade suffer more severe wear and are repaired for re-use, wherein material has to be deposited again in order to restore the original geometry, the so-called feathered edge which constitutes an encompassing wall along the outer contour of the blade airfoil.

Deposition welding methods such as laser deposition welding methods are the prior art.

The restored turbine blade in the region of the crown base has to be free of defects and pores, is to have small macrograins, the welding material is to be applied to the blade airfoil with an allowance, and is also to be produced inexpensively.

In this case, in addition to the laser parameters such as heating, laser power, powder mass flow and feed speed, the corresponding travel strategy of the welding head also plays a role.

SUMMARY

An aspect relates to proposing a build-up strategy by means of which the above-mentioned requirements can be fulfilled.

BRIEF DESCRIPTION

Some of the embodiments will be described in detail, with reference to the following figures, wherein like designations denote like members, wherein:

FIG. 4 shows a turbine blade, in accordance with embodiments of the present invention; and FIG. 5 shows a list of superalloys, in accordance with embodiments of the present invention.

The description and figures represent only exemplary embodiments of the invention.

DETAILED DESCRIPTION

Figure 1:
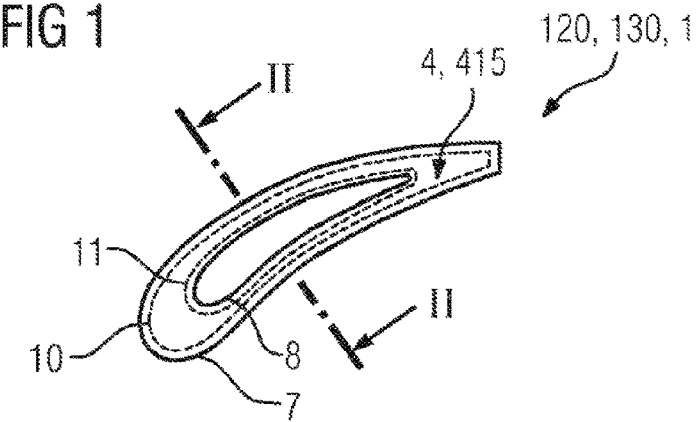
FIG. 1 shows a top view of a surface of a turbine blade on which material is deposited, in accordance with embodiments of the present invention.

Shown in FIG. 1 is a top view of a surface 4, especially of a blade tip 415 (FIG. 4) of a turbine blade 120, 130, or generally as a component 1.

The surface 4, 415 is preferably planar.

The longitudinal, curved shape or the typical geometry of a blade airfoil 406 (FIG. 4) is to be seen in cross section. In order to achieve an intended geometry in cross section as in FIG. 2, material is to be deposited upon the surface 4, 415 which in particular represents a correspondingly reconditioned surface of an already used turbine blade 120, 130.

The blade airfoil of the turbine blade 120, 130 has an outer contour 7.

In the first step, an outer encompassing welding track 10 is preferably laid along the contour 7 before first welding tracks for weld layers are applied.

If the encompassing wall 13 is deposition welded, an inner encompassing welding track 11 is preferably similarly laid along an inner contour 8, which is to be generated, before first welding tracks are applied for weld layers between the contours 7 and 8.

Figure 2:
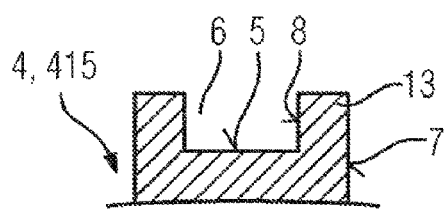
FIG. 2 shows a cross section through an intended geometry of a blade tip, in accordance with embodiments of the present invention.

Shown in FIG. 2 is a cross section through an intended geometry of a crown base 4 with an encompassing wall 13, especially a feathered edge of a turbine blade, and a cavity 6. Material has been deposited onto the surface 4, 415 so that a wall 13 has been formed along the contour 7 so that a top-open cavity 6 is created with the inner contour 8.

It may be preferably necessary to also completely coat or to generate the surface 4, 415 in first steps in a multiplicity of weld layers before an encompassing wall 13 is welded. An inner encompassing welding track 11 is preferably not then first of all implemented.

The wall 13 is at least two welding track widths wide.

In the middle of the surface 4, 415, a top-open cavity 6 is formed with the inner surface 5.

Figure 3:
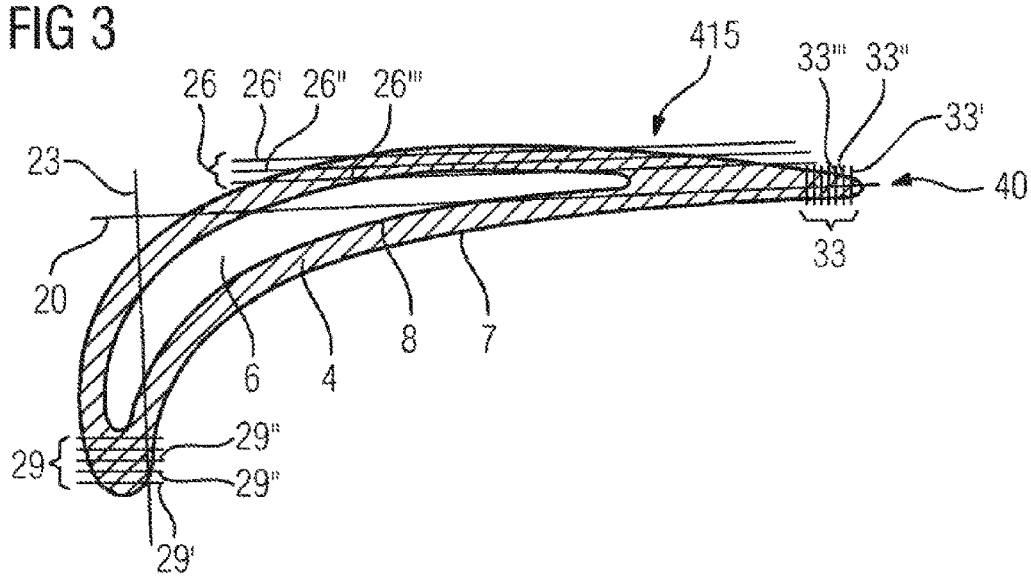
FIG. 3 shows a procedure of the build-up strategy, in accordance with embodiments of the present invention.

FIG. 3 shows first steps for large-area build-up of material, especially for an encompassing wall 13.

The welding tracks 26 (26', 26", . . . ), 29 (29', 29" . . . ) are laid parallel to a longitudinal line 20.

The longitudinal line 20 is preferably oriented toward the longitudinal direction of the surface 4, 415. The longitudinal line 20 can especially extend through an end 40 of the surface 4, 415 and constitutes there the almost longest, rectilinear progression on the surface 4, 415.

The weld beads 26, 29 start preferably at one end, especially 26' of the surface 4, 415, and extend in a straight line. If the welding track leaves the outer contour 7, then the deposition process is shifted to the next welding track which is displaced by a defined distance.

In the regions in which the cavity 6 exists no material is deposited so that the longitudinal line 20 or parallels to it only represent the progression of the relative movement between substrate 120 and welding head (not shown).

In the first weld layer, the surface 4, 415, which is to be coated with material, is created completely with parallel extending welding tracks 26, 29. The welding tracks are shifted, preferably continuously, from one side, in this case 26', to the other side, in this case 29'.

In a second step, a second weld layer of welding tracks, which are laid parallel to a transverse line 23 (33', 33". . . ), is created. The transverse line 23 extends transversely to the longitudinal line 20, especially at an angle of 70° to 110°, rather especially 80° to 110°, to a longitudinal line 20.

The transverse line 23 preferably extends perpendicularly to the longitudinal line 20.

The second weld layer covers the first weld layer.

In this case also, the lines 33', 33", . . . only represent the relative movement between the blade tip and the welding head, i.e. when the inner surface 5 is created, no material is deposited there by the material feed in the region being stopped.

The second weld layer preferably begins at one end 40 of the surface 4, 415 and is then subsequently coated by means of welding tracks which are directly adjacent to each other or preferably overlap.

The sequence can also be reversed:

The welding tracks 33 (33', 33", . . . ) are laid parallel to a transverse line 23. The transverse line 23 is preferably oriented transversely to the longitudinal direction 20 of the surface 4, 415.

The weld beads 33', 33" preferably start at one end, e.g. 40, of the surface 4, 415 and extend in a straight line. If the welding track leaves the outer contour 7, then the deposition process is shifted to the next welding track which is displaced by a defined distance.

In the regions in which the cavity 6 exists, no material is deposited so that the transverse line 23 or parallels to it only represent(s) the progress of the relative movement between substrate 120 and welding head (not shown).

In the first weld layer, the surface 4, 415 which is to be coated with material is created completely with parallel extending welding tracks 33. The welding tracks are shifted, preferably continuously, from one side, in this case 40, 412, to the other side, in this case 409 (FIG. 4).

In a second step, a second weld layer of welding tracks, which are laid parallel to a longitudinal line 20 (26, 29), is created, wherein the longitudinal line 20 extends transversely to the transverse line 23, especially at an angle of 70° to 110°, rather especially 80° to 110°, to the transverse line 23.

The longitudinal line 20 preferably extends perpendicularly to the transverse line 23.

The second weld layer covers the first weld layer.

In this case also, the lines 26, 29, . . . only represent the relative movement between the blade tip and the welding head, i.e. when the inner surface 5 is created, no material is deposited there by the material feed in the region being stopped.

The second weld layer preferably begins on one side of the surface 4, 415 and is then subsequently coated by means of welding tracks which are directly adjacent to each other or preferably overlap.

The desired height of the wall 13 is achieved by the procedure according to FIG. 3 being repeated until the desired height of the wall 13 is achieved.

The turbine blade 120, 130 features a nickel-based or cobalt-base superalloy, especially an alloy according to FIG. 5.

The welding material also constitutes a nickel-based or cobalt-based alloy and preferably differs from the material of the component 1, 120, 130. The difference means that at least one alloy element has a 10% higher or lower proportion of this alloy element.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for material deposition onto a surface, in which a free-standing wall or a top-open cavity is created, wherein either a first complete weld layer is created on the surface by means of welding tracks, wherein all the welding tracks are applied parallel to a longitudinal line, wherein the longitudinal line being oriented longitudinally to the surface, and then after a further complete weld layer is created on the surface, wherein for the further complete weld layer all the welding tracks extend parallel to a transverse line, wherein the transverse line extends parallel to the longitudinal line, at an angle of 80° to 100°, or a first complete weld layer is created on the surface by means of welding tracks, wherein all the welding tracks are applied parallel to a transverse line, wherein the transverse line is oriented transversely to a longitudinal line of the surface, and then after the further complete weld layer is created on the surface, wherein for the further complete weld layer all the welding tracks extend parallel to a longitudinal line, wherein the longitudinal line extends transversely to the transverse line, at an angle of 80° to 100°, and wherein the longitudinal line is preferably oriented longitudinally to the surface.

2. The method as claimed in claim 1, wherein an outer encompassing weld track is laid along an outer contour of the surface before applying the first complete weld layer.

3. The method as claimed in claim 1, in wherein an inner encompassing welding track is laid along an inner contour of the surface before applying the first complete weld layer.

4. The method as claimed in claim 1, wherein a relative movement is carried out along the longitudinal line between the surface and a welding head, and no material deposition is carried out where the cavity occurs, by an energy source, and a laser or the plasma, being shut off and/or by the material feed being stopped.

5. The method as claimed in claim 1, wherein laser powder deposition welding is used.

6. The method as claimed in claim 1, wherein the surface is formed flat.

7. The method as claimed in claim 1, wherein the longitudinal line extends through one end of the surface and wherein the longitudinal line in comparison to the transverse line has a higher proportion along the surface, especially at least 20%, rather especially at least 50%, proportion along the surface.

8. The method as claimed in claim 1, wherein the surface is a surface of a turbine blade, and is coated.

9. A turbine rotor blade with a crown base, produced by the method claimed in claim 1, which has a free-standing wall or a top-open cavity, wherein the free-standing wall is formed by weld layers of a plurality of welding tracks, wherein all of the welding tracks of the consecutive welding tracks of a weld layer extend at an angle of 80° to 100° to each other.

10. The blade as claimed in claim 9, wherein an outer encompassing welding track is provided along an outer contour of the surface.

11. The blade as claimed in claim 9, wherein an inner encompassing welding track is provided along an inner contour of the surface.

12. The method as claimed in claim 7, wherein the longitudinal line in comparison to the transverse line has at least 20% proportion along the surface.

13. The method as claimed in claim 7, wherein the longitudinal line in comparison to the transverse line has at least 50%, proportion along the surface.

* * * * *